United States Patent Office 2,841,679
Patented July 1, 1958

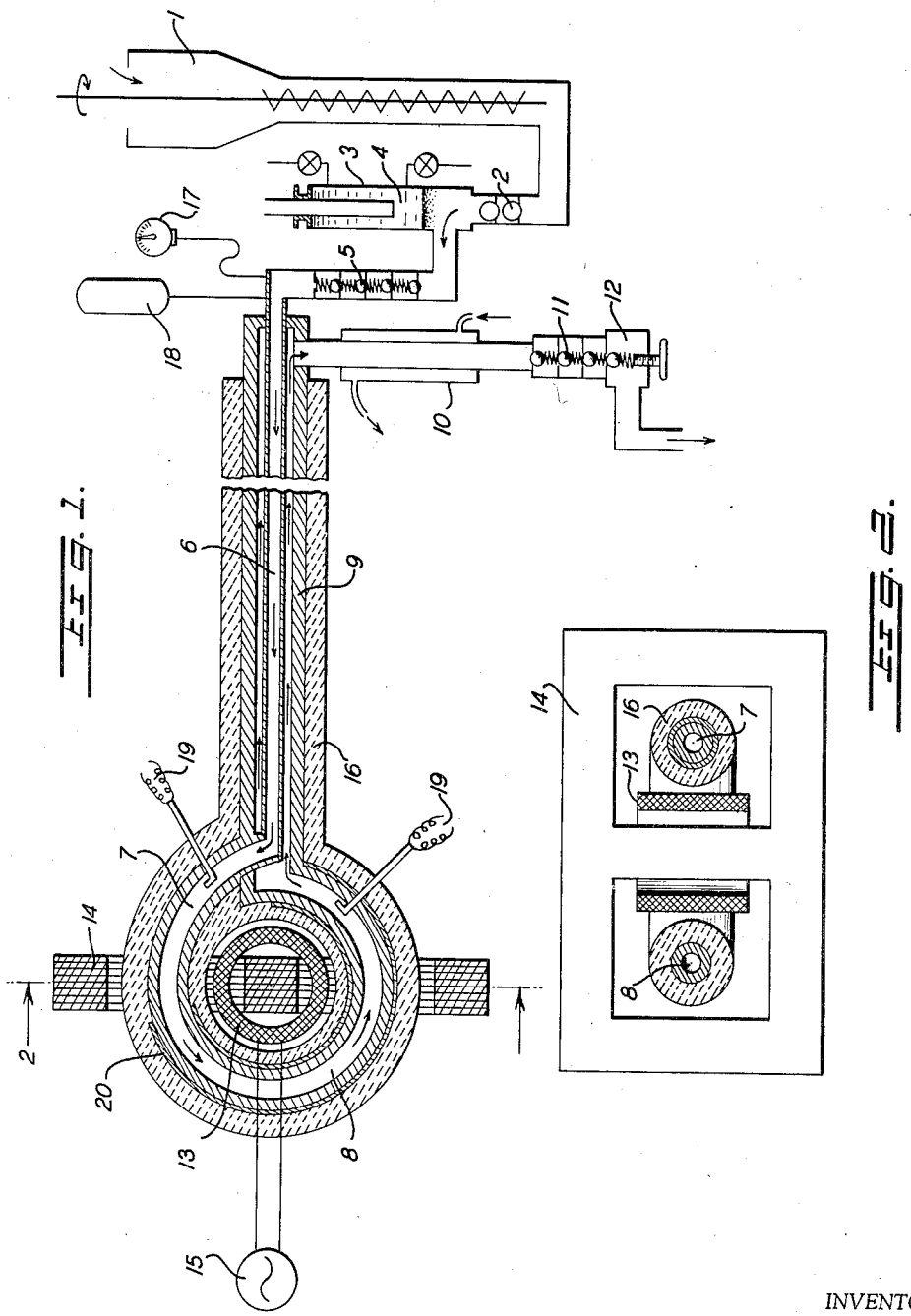

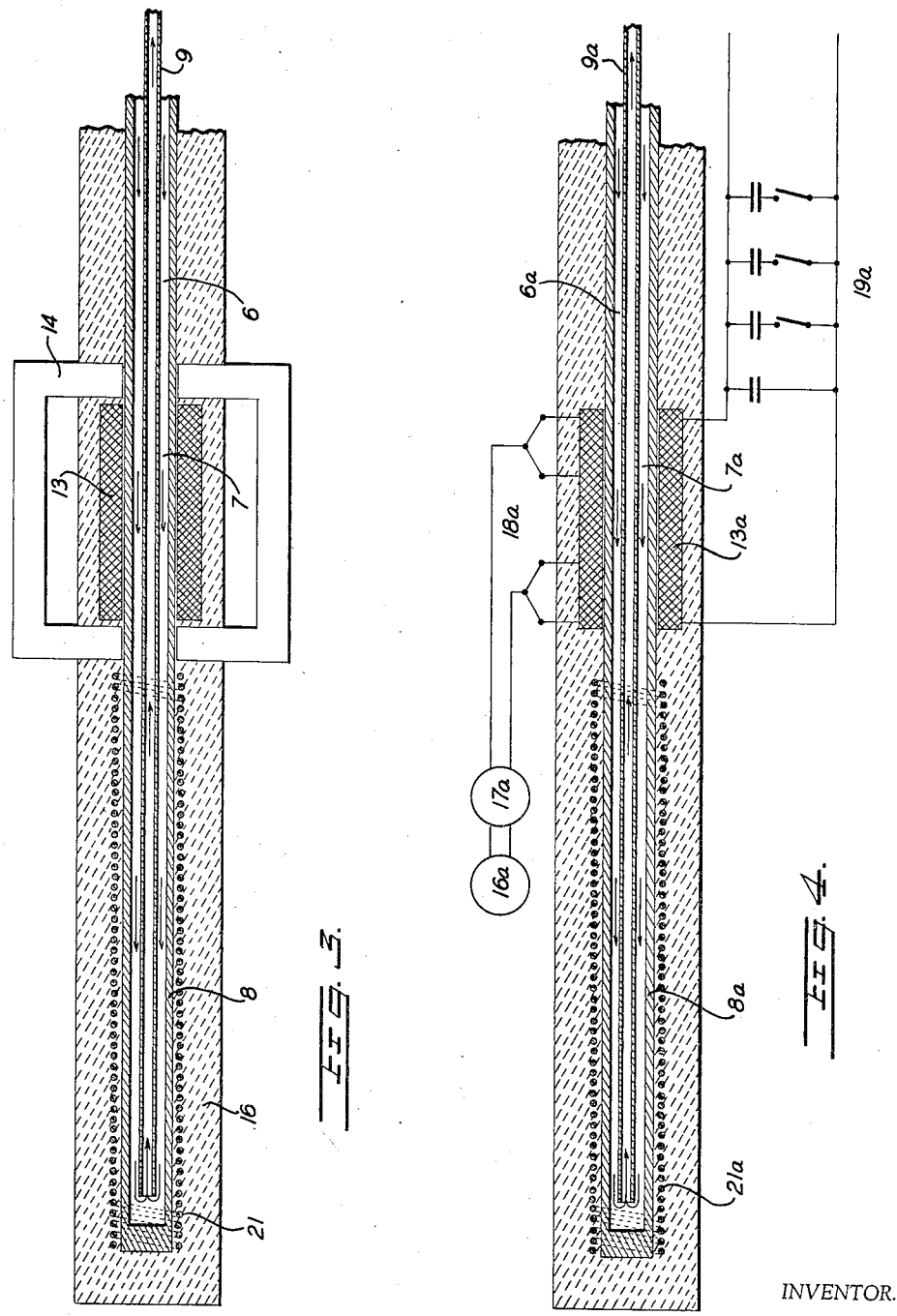

2,841,679

DYNAMIC AUTOCLAVE FOR THE CONTINUOUS TREATING OF ORES UNDER HIGH TEMPERATURE AND HIGH PRESSURE IN THE VICINITY OF THE CRITICAL TEMPERATURE OF WATER

Jumei Yamazaki, Kochi City, Japan

Application September 6, 1956, Serial No. 608,313

7 Claims. (Cl. 219—10.51)

This invention relates to a dynamic pressure reactor device for the continuous treatment of ores under conditions of high pressure and temperature in the area of the critical temperature of water.

The invention will be more fully described taken in conjunction with the accompanying drawings, in which:

Fig. 1 is a longitudinal sectional view of a high pressure autoclave device arrangement in which the high pressure reactor thereof encircles the core thereof as the secondary circuit and which is heated by a low frequency induction current;

Fig. 2 is a cross sectional view taken on line A—A of Fig. 1,

Fig. 3 is a sectional view of the reactor which consists of a double straight pipe surrounded by an induction coil and is heated by induced eddy current, the reactor itself acting as the core thereof; and Fig. 4 is an example of a modification of the reactor with an electric circuit of high frequency induction heating.

Referring now to Figs. 1 and 2 in which like numerals refer to like parts throughout, there is provided a feed tank, containing spiral conveying means, said tank is used for mixing the ore with a liquid such as water to form a paste or slurry in the feed tank. Furthermore, said tank has a side conduit portion with an upper portion having a plurality of suction ball check means 2. Above said means, as shown, there is provided a paste pump 3 which is adapted to contain oil 4 therein, said oil being supplied in any suitable manner. It will be noted that said pump 3 has piston means and is adapted to force the paste into a side conduit 4a which is provided with a series of discharge ball checks 5, so that the pasty material can be successively fed forwardly in a longitudinally extending inner pipe 6 of the reactor as shown without return. Said pipe 6 forms a part of the heat exchange means in the reactor as shown.

Pipe 6 has a portion which curves or spirals forming the circular part 7 of the reactor for induction heating of the paste or contents in said pipe as said contents are being forced therein by means of pump 3. Said circular pipe 7 has a portion 8 of the reactor for helping maintain the desired temperature constant therein.

An outer high pressure pipe 9 forms part of the heat exchanger of the reactor. Said pipe 9 is concentric with pipe 8. It will be noted that due to the action of pump 3 the ore in paste or slurry form is being continuously forced through pipe 6 during the treating operation.

A cooler 10 at the terminal portion of the pipe 9 is provided, which cooler is in connection with a series of pressure reducing ball valves 11 which are in communication with a discharging ball valve mechanism 12.

Located in the circular or spiral portion of the reactor there is a primary coil 13 alternating with a core 14, and a voltage regulating and adjusting source 15. A heat insulating coating 16 of any desired thickness is provided which extends the full length of the outside of the reactor. Said coating may be of any suitable material such as asbestos. Furthermore, a pressure gage 17 and a pressure cushioning vessel 17 are provided at the beginning portion of the inner pipe 6 of the reactor. The circular portion of the reactor is provided with thermocouples 19 for measuring the temperature in the interior of circular portions 7 and 8 of the pipe 6 during the one treating operation. A layer, sheeting or coating 20 of copper is provided in the circular portion of pipes 7 and 8 as shown to permit lowering of the electrical resistance during the operation of the reactor.

In Figs. 3 and 4, I show the conduits 6a and 9a for the incoming and outgoing of the ore in paste form, said conduits forming the heat exchange portion of the reactor. In addition, there is provided an insulation 8a of suitable material which forms the outer portion of the heat exchanger and is intended to maintain the temperature constant during the heat treating operation of the ore.

An induction coil 13a of either high or low capacity is provided. Said coil is preferably made of copper or other suitable high conducting material. A core member 14a is provided surrounding said induction coil. It will be noted that there is provided a Nichrome wire coil 21a extending the full length of the reactor up to the core 14a as shown for heating at a desired temperature, the insulation 8a of the reactor and maintaining the same at such temperature. An electrical circuit diagram with controlling parts comprising wiring 16a, 17a, 18a and 19a is shown for permitting high frequency induction heating.

In the operation of the reactor hereinabove described, muddy or pasty raw material or ores and the like as described in my copending U. S. application Serial No. 478,467, filed December 29, 1954, is continuously fed into the reactor by means of pump 3. Oil or other suitable material is fed into the upper part of the pump in order to avoid abrasion of the parts by the paste material which is quite sandy. Inside the reactor, the entering paste is preheated by means of the returning hot paste coming through the heat exchanger while passing inner pipe 6 and going into the part 7 which is inductively heated and in which Joule's heat is produced along the path in the reactor itself by a large secondary current of low voltage. During this operation, the temperature of the flowing paste reaches the desired point at the end of part 7 and remaining constant while passing the part 8 goes into the returning heat exchanger part 9. On the return of the pasty material through the heated part 9, the heat of said slurry of pasty material is transferred to the entering cool paste by heat exchange and its remaining heat is removed by cooler 10, whereupon the pasty material or slurry is discharged through the reducing or discharging valves 11 and 12.

In accordance with my invention, the method of heating is designed so as to generate heat in the reactor itself by low or high frequency induction heating.

In Figs. 1 and 2, Joule's heat is generated inside the reactor wall by the induced current of ordinary frequency along the flow path, while in Figs. 3 and 4 the heat is by eddy currents along the cross section of the reactor wall which acts as the core of the induction coil.

It is to be noted that the reactors herein described consist of three parts. First, the heat exchange part which contains a double concentric pipe; second, the induction heating means; and third the temperature maintaining means which is slightly or weakly heated to compensate for heat lost from the surface. Said weak heating of that portion of 8 to maintain a constant temperature is possible for example in the type shown in Fig. 1 by covering this part with copper thus lowering the electrical resistance in the circuit, while in the type shown in Fig. 3 or 4 this is done by independent electrical heating of Nichrome wire or by induction. It is to be further noted that the reactor may be made of low carbon steel, stainless steel or other special steels, the surface facing the slurry or pasty material being lined with corrosion proof material, for instance copper or Monel metal.

In the operation of the invention, the hydrothermal reaction is designed to take place while the slurry passes through conduit or pipe 7 and 8. The scale and length of said conduit 7 and 8 and the flow velocity are determined by the required reaction time.

The settling of slurry caused by a marked decrease of the density of heated water in the vicinity of the critical temperature is avoidable by using smaller particles or increasing the viscosity of the slurry. The spiral motion of the slurry caused by a spiral gutter or a screw wire in the reactor is effective for both heat exchange and the prevention of settling. Also the inner reaction pipe made to play the role of a screw conveyor will ensure good effects on stirring, heat exchange, etc.

The working pressure is always higher than the saturated vapor pressure of the slurry. The elevated density of the compressed water also contributes to the prevention of the settling of slurry. The great pressure, for instance 300 kg./cm.$^2$ at 370° C. serves to make paste flow smooth, owing to the raised stability of slurry.

Naturally the maximum allowable pressure of autoclaves is determined by their ratio of the inside to outside radius. Therefore large volumed autoclaves of the tank type heretofore in use with a comparatively large inner radius need an extraordinary wall thickness to work at high pressure. It becomes practically impossible to construct such apparatuses as bear 200 kg./cm.$^2$ or so. The apparatus in this invention is related to my former invention for which I have been granted Japanese patent (Pat No. 21,346, 1955, Japan) and for which I am applying for American patent at present (Ser. No. 478,467, filed Dec. 29, 1954). The apparatus in my present invention makes the method of my former invention most economically practicable.

This newly invented apparatus in combination with my former invention has the following characteristics which make it different from those heretofore in use.

(1) The fact that heating occurs inside the reactor makes possible the sensitive regulation of temperature as well as the rapid supply of a large amount of heat to the slurry along the radius direction of the reactor wall without remarkable temperature gradient, so as not to cause any stress by heating.

(2) The fact that the working pressure while in continuous operation freely variable above saturation vapor pressure by simple regulation of discharge valves is profitable in several ways, for instance, slurry stability in working temperature, the increase in reaction rate by elevated pressure, general smooth operation and so on.

(3) Simple and effective heat exchange is automatically practicable between the going and returning paste flows. This is very useful for the saving of electric power consumption.

(4) A small scale apparatus with a dynamic mechanism enables us to treat a large amount of ore materials economically.

(5) Mutual relations between inventions.

This invention is related to the method of my copending application (Serial No. 478,467, filed in the U. S. December 29, 1954), so that method is to be used when one extracts alkali elements from their ores by the apparatus of this invention.

While a preferred embodiment of my invention has been illustrated and described it is to be understood that modifications as to form, arrangement of parts and use of materials may be made without departing from the spirit and scope of the invention as claimed.

I claim:

1. A high pressure and temperature device of continuous operation for the hydrothermal treatment of ores in a pasty or slurry condition, comprising a long double conduit high pressure reactor consisting of a part of said double reactor for purpose of heat exchange, another part for induction heating, and thirdly a part for maintaining the temperature constant thereat, heating means for said third part, and means for dynamically and continuously forcing said paste through the reactor, and means for selectively heating the paste in the reactor under high pressure at desired intervals.

2. A high pressure and temperature device according to claim 1 wherein there is provided a curved section in the reactor for induction heating and means for keeping the temperature constant, and the conduit is concentric to permit heat exchange therein.

3. A device according to claim 1 composed of a straight double piped reactor in which one part is provided for heat exchange, another for induction heating and another for maintaining the temperature constant at a high pressure.

4. The device according to claim 3, wherein the reactor is provided with a relatively thick wall to fit the continuous flow of pasty material under a pressure markedly higher than the saturation vapor pressure of the raw materials being treated.

5. A high pressure and temperature device for the continuous treatment of ores while in a pasty or slurry condition comprising spiral conveying means for the ore, pressure forcing means in connection with the conveying means, for continuously pasting said ore, a conduit in connection with said pressure forcing receiving said ore, curved conduit means extending from the conduit means for receiving said ore, regulatable heating means for said curved conduit means, an outer conduit extending from the curved conduit means and concentric with the first conduit for the return flow of said ore, cooling means in connection with the outer conduit, and discharging means for said last named conduit.

6. A device according to claim 5 wherein the curved conduit is provided with a heat conducting surface, and the conduits are covered with insulating material.

7. A device according to claim 5 wherein all conduits are straight and a portion thereof is heated by induction heating.

References Cited in the file of this patent

UNITED STATES PATENTS

| | | |
|---|---|---|
| 2,465,283 | Schlehr | Mar. 22, 1949 |
| 2,519,481 | Kubie et al. | Aug. 22, 1950 |

FOREIGN PATENTS

| | | |
|---|---|---|
| 527,977 | France | Nov. 4, 1921 |